(12) United States Patent
Okuyama et al.

(10) Patent No.: US 9,545,957 B2
(45) Date of Patent: Jan. 17, 2017

(54) UPPER VEHICLE-BODY STRUCTURE OF VEHICLE

(71) Applicant: MAZDA MOTOR CORPORATION, Hiroshima (JP)

(72) Inventors: Tomohito Okuyama, Hiroshima (JP); Yuki Kodama, Aki-gun (JP); Tetsunori Hada, Hiroshima (JP)

(73) Assignee: Mazda Motor Corporation, Hiroshima (JP)

( * ) Notice: Subject to any disclaimer, the term of this patent is extended or adjusted under 35 U.S.C. 154(b) by 0 days.

(21) Appl. No.: 15/153,371

(22) Filed: May 12, 2016

(65) Prior Publication Data

US 2016/0332674 A1 Nov. 17, 2016

(30) Foreign Application Priority Data

May 15, 2015 (JP) ................................. 2015-099596

(51) Int. Cl.
*B62D 29/00* (2006.01)
*B62D 25/04* (2006.01)
*B62D 25/06* (2006.01)

(52) U.S. Cl.
CPC ............. *B62D 29/001* (2013.01); *B62D 25/04* (2013.01); *B62D 25/06* (2013.01)

(58) Field of Classification Search
CPC ........ B62D 29/001; B62D 25/04; B62D 25/06

USPC .................. 296/193.06, 210, 203.03, 187.12
See application file for complete search history.

(56) References Cited

U.S. PATENT DOCUMENTS

| | | | | |
|---|---|---|---|---|
| 6,619,727 B1* | 9/2003 | Barz | ...................... | B62D 25/04 296/146.6 |
| 8,491,046 B2* | 7/2013 | Nagai | .................... | B62D 25/02 296/146.6 |

FOREIGN PATENT DOCUMENTS

JP 2001-191947 A 7/2001

* cited by examiner

*Primary Examiner* — Joseph D Pape
(74) *Attorney, Agent, or Firm* — Studebaker & Brackett PC

(57) ABSTRACT

There are provided a center pillar, a roof side rail connected to an upper end portion of the center pillar and having a closed cross section extending in a vehicle longitudinal direction, and a synthetic resin-made reinforcing member provided inside the roof side rail at a position near an upper end portion of the center pillar. The roof side rail comprises a roof rail inner having a protrusion portion and a roof rail outer forming the closed cross section together with the roof rail inner. The reinforcing member is provided to have a gap from the roof rail outer and integrally joined to an outward face, in a vehicle width direction, of the roof rail inner which is roughened by an anchor effect.

9 Claims, 8 Drawing Sheets

UPPER VEHICLE-BODY STRUCTURE OF VEHICLE

BACKGROUND OF THE INVENTION

The present invention relates to an upper vehicle-body structure of a vehicle, and particularly relates to the upper vehicle-body structure of the vehicle comprising a synthetic resin-made reinforcing member provided inside a roof side rail.

A structure of the vehicle in which the reinforcing member for improving the vehicle-body rigidity is provided in a closed cross section of a frame is known because the vehicle requires the collision safety, the maneuverability and stability, and the silence.

Japanese Patent Laid-Open Publication No. 2001-191947 discloses an upper vehicle-body structure which comprises a hard synthetic resin-made first reinforcing member which is provided inside a center pillar and a hard synthetic resin-made second reinforcing member which is provided inside a roof side portion for the purpose of increasing the strength against a vehicle side collision.

In the upper vehicle-body structure of the above-described patent document, the first and second reinforcing members are fixed to specified positions inside the respective frames by filling foamable resin. However, this structure has the following problems. First, it cannot be confirmed in manufacturing whether or not the reinforcing members and respective inside faces of the frames are joined together by the foamable resin without any gap formed therebetween. Secondly, when the frames are deformed by an external force, adhesion portions with the foamable resin are destroyed in an early stage and thereby separate moves of the frames and the reinforcing members are allowed, so that the performance of the reinforcing members for suppressing deformation of frame sections cannot be obtained as expected. Thirdly, the foaming agent blocks smooth flowing of electrodeposition liquid inside the frames, so that rusting is induced on an inner face of the frames.

SUMMARY OF THE INVENTION

An object of the present invention is to provide an upper vehicle-body structure of a vehicle which can properly improve the vehicle-body strength, ensuring manufacturing quality.

The present invention is an upper vehicle-body structure of a vehicle, comprising a pillar member extending in a vertical direction, a roof side rail connected to an upper end portion of the pillar member and having a closed cross section extending in a vehicle longitudinal direction, and a synthetic resin-made reinforcing member provided inside the roof side rail at a position near the upper end portion of the pillar member, wherein the roof side rail comprises a metal-made inner member which has a portion protruding toward a cabin and a metal-made outer member which forms the closed cross section together with the inner member, the reinforcing member provided inside the closed cross section formed by the inner member and the outer member is provided to have a gap from the outer member, the reinforcing member has a wall-face portion on an inner-member side thereof, and the wall-face portion of the reinforcing member is integrally joined to an outward face, in a vehicle width direction, of the inner member by an anchor effect (anchoring effect).

According to the present upper vehicle-body structure of the vehicle, since there is provided the synthetic resin-made reinforcing member provided inside the roof side rail at the position near the upper end portion of the pillar member, improving the vehicle-body rigidity and making the vehicle lightweight can be compatibly achieved. Further, since the wall-face portion of the reinforcing member is integrally joined to the outward face, in the vehicle width direction, of the inner member of the roof side rail by the anchor (anchoring) effect, the reinforcing member can be fixed mechanically and accurately inside the roof side rail, allowing manufacturing tolerance. Moreover, a relative slip of the inner member to the reinforcing member is regulated, so that buckling which occurs with a buckling starting point at the portion protruding toward the cabin can be suppressed.

In an embodiment of the present invention, the inner member of the roof side rail has the protrusion portion which protrudes toward the cabin relative a line which connects an upper end portion of the inner member and a lower end portion of the inner member.

According to this embodiment, an area of the cross section of the roof side rail is made so large, without being flattened, that the bending strength of the metal-made roof side rail itself can be increased, whereas a buckling phenomenon caused by the protrusion portion can be prevented.

In another embodiment of the present invention, the protrusion portion of the inner member of the roof side rail comprises a ridgeline portion which extends in the vehicle longitudinal direction at an apex thereof and a pair of flat-face portions positioned above and below the ridgeline portion.

According to this embodiment, the strength of the roof side rail can be effectively increased by the ridgeline portion (corner portion), whereas the buckling phenomenon caused by this ridgeline portion (corner portion) can be prevented. Further, since the flat-face portions are provided, a larger space for arranging a curtain airbag, a harness, or the like can be generated properly in a space located on the side of the cabin (compared with a case in which the above-described flat-face portions are formed in a round shape).

In another embodiment of the present invention, the reinforcing member further comprises plural vertical ribs which extend in the vertical direction in an area which matches the protrusion portion of the inner member.

According to this embodiment, these ribs produce a force against buckling of the metal-made inner member of the roof side rail, so that the buckling can be suppressed effectively.

In another embodiment of the present invention, the reinforcing member further comprises a lateral rib which extends in the vehicle longitudinal direction, crossing and connecting to the plural vertical ribs.

According to this embodiment, the lateral rib reinforces the vertical ribs, so that that buckling of the vertical ribs can be suppressed.

In another embodiment of the present invention, a treatment of roughening the outward face, in the vehicle width direction, of the inner member of the roof side rail is applied, whereby the anchor (anchoring) effect is provided.

According to this embodiment, the anchor (anchoring) effect of the reinforcing member and the inner member of the roof side rail can be increased with a simple structure.

In another embodiment of the present invention, the reinforcing member is formed integrally by injection molding in which the inner member of the roof side frame is incorporated.

According to this embodiment, the reinforcing member and the inner member of the roof side rail can be formed integrally with a simple structure.

Other features, aspects, and advantages of the present invention will become apparent from the following description which refers to the accompanying drawings.

BRIEF DESCRIPTION OF THE DRAWINGS

FIG. 6A is a vertical sectional view of a roof rail inner before a surface treatment; FIG. 6B is a vertical sectional view of the roof rail inner after the surface treatment; and FIG. 6C is a major-part vertical sectional view of the reinforcing member and the roof rail inner after injection molding.

DETAILED DESCRIPTION OF THE INVENTION

Hereafter, embodiments of the present invention will be described referring to the accompanying drawings. The following description exemplifies the present invention applied to a vehicle V, and applications or uses of the present invention are not to be limited. In figures, an arrow F shows a forward direction, an arrow L shows a leftward direction, and an arrow U shows an upward direction.

Figure 1:
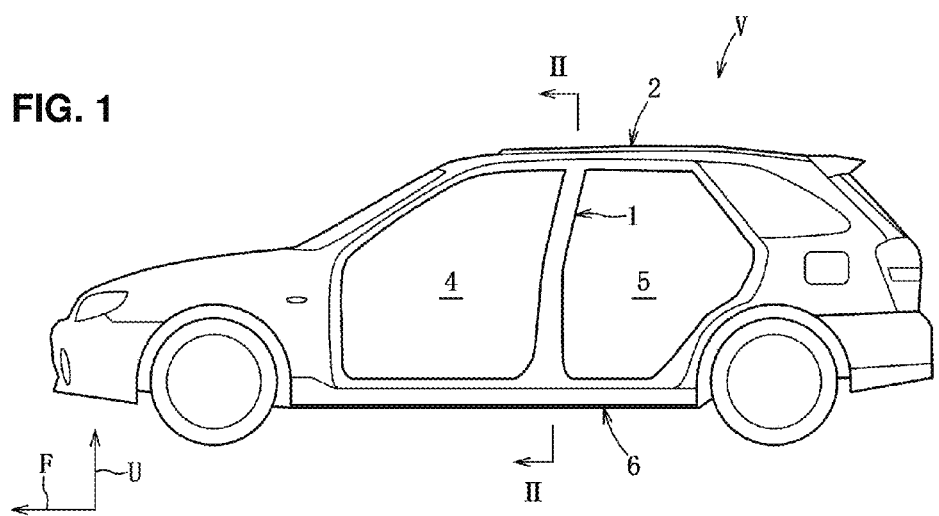
FIG. 1 is a side view of a vehicle according to an embodiment.
Figure 2:
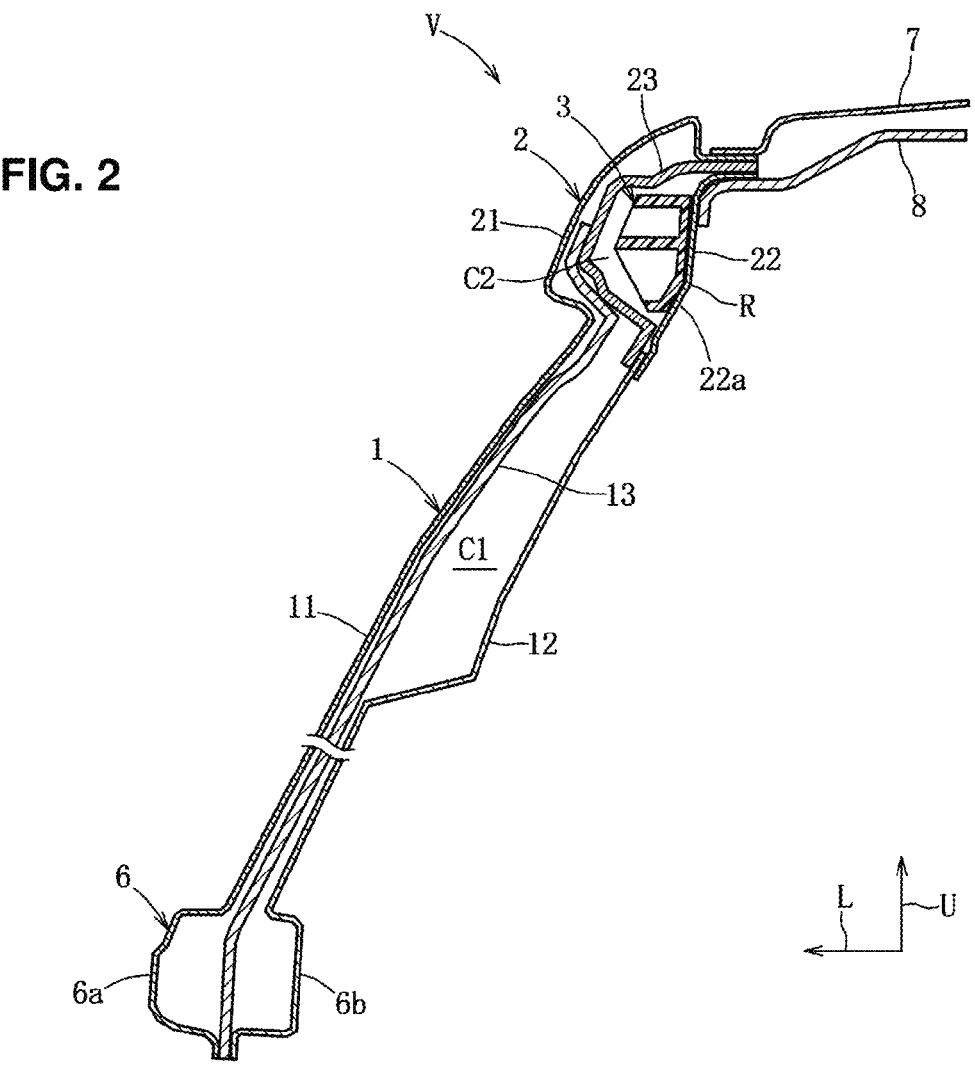
FIG. 2 is a sectional view taken along line II-II of FIG. 1.
Figure 3:
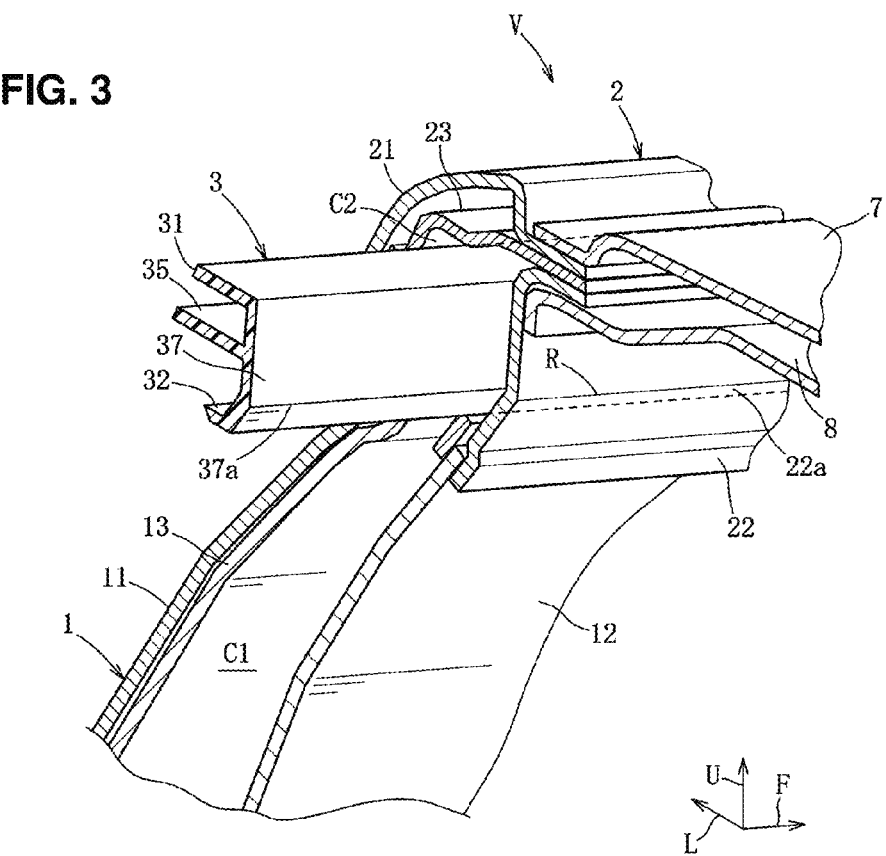
FIG. 3 is a perspective view of a sectional portion taken along line II-II of FIG. 1, when viewed from an inside of a cabin.

Hereafter, an embodiment of the present invention will be described referring to FIGS. 1-12. As shown in FIGS. 1-3, the vehicle V comprises a pair of right-and-left center pillars 1 (pillar member) which extend in a vertical direction, a pair of right-and-left roof side rails 2 which connect to respective upper end portions of the pair of center pillars 1 and extend in a vehicle longitudinal direction, a pair of right-and-left synthetic resin-made reinforcing members 3 which are provided inside the pair of roof side rails 2, and others. Herein, the vehicle V has a symmetrical structure, and therefore a left-side part of the structure will be described primarily.

First, the center pillar 1 will be described. As shown in FIGS. 1-3, the center pillar 1 is configured to longitudinally partition a front door opening 4 from a rear door opening 5 and extend upward from a middle portion of a side sill 6 which has a closed cross section extending in the vehicle longitudinal direction to a middle portion of the roof side rail 2. This center pillar 1 is further configured to incline rightward (toward a cabin) (see FIG. 2). The center pillar 1 comprises a pillar outer panel 11, a pillar inner panel 12, a pillar reinforcement 13, and others.

The pillar outer panel 11 is configured to have a roughly hat-shaped cross section and connect to an upper end portion of the side sill outer panel 6a. The pillar outer panel 11 forms a closed cross section C1 extending vertically together with the pillar inner panel 12. The pillar inner panel 12 is configured to have a roughly hat-shaped cross section and connect to an upper end portion of the side sill inner panel 6b. The pillar reinforcement 13 is provided to partition the closed cross section C1 laterally. The pillar reinforcement 13 is configured to extend downward such that its lower end portion is interposed between a lower end portion of the side sill outer panel 6a and a lower end portion of the side sill inner panel 6b and fixed these.

Next, the roof side rail 2 will be described. As shown in FIGS. 1-3, the roof side rail 2 is formed substantially straightly from a front-upper end portion of the front door opening 4 to a front-upper end portion of the rear door opening 5. The roof side rail 2 comprises a roof side rail outer panel 21, a roof side rail inner panel 22 (inner member), a roof side rail reinforcement 23 (outer member), and others. In the following description, the roof side rail outer panel 21 will be referred to as the roof rail outer 21, the roof side rail inner panel 22 will be referred to as the roof rail inner 22, and the roof side rail reinforcement 23 will be referred to as the roof rail reinforcement 23.

The roof rail outer 21 is integrally formed with the side sill outer panel 6a, the pillar outer panel 11, and others by pressing a steel plate. The roof rail outer 21 is configured to protrude leftward and upward in a front view, having a roughly fan-shaped cross section. A flange portion extending in the vehicle longitudinal direction is formed at an upper end portion of the roof rail outer 21, and a left end portion of the roof panel 7 is joined to an upper face of the flange portion. The roof rail outer 21 forms a closed cross section which extends in the vehicle longitudinal direction and connects to the closed cross section C1 together with the roof rail inner 22.

The roof rail inner 22 is formed by pressing a steel plate. As shown in FIGS. 2 and 3, a flange portion which extends in the vehicle longitudinal direction is formed at an upper end portion of the roof rail inner 22, and this flange portion is joined to a lower face of the flange portion of the roof rail outer 21 via an upper-end flange portion of the roof rail reinforcement 23. A left end portion of a roof cross member 8 is joined to a right-side (outward) face of the roof rail inner 22. At a middle portion of the roof rail inner 22 are formed a ridgeline R which extends in the vehicle longitudinal direction and a protrusion portion 22a which protrudes rightward. The protrusion portion 22a is configured in a front view such that a lower half part of the roof rail inner 22 bends clockwise around the ridgeline R relative to an extension line of an upper half part of the roof rail inner 22 which extends roughly perpendicularly. A flange portion is formed at a lower end portion of the roof rail inner 22, and this flange portion is joined to a flange portion which is formed at an upper end portion of the pillar inner panel 12 and extends in the vehicle longitudinal direction.

The roof rail inner 23 is formed by pressing a steel plate and configured to protrude leftward and upward in the front view, having a roughly hat-shaped cross section. A flange portion extending in the vehicle longitudinal direction is formed at an upper end portion of the roof rail reinforcement 23, and this flange portion is interposed between the flange portions of the roof rail outer 21 and the roof rail inner 22 and fixed to these. A flange portion extending in the vehicle longitudinal direction is formed at a lower end portion of the roof rail reinforcement 23, and this flange portion is joined to the lower-end side flange portion of the roof rail inner 22 via the flange portion of the pillar inner panel 12. Thereby, the roof rail reinforcement 23 forms a closed cross section C2 together with the roof rail inner 22. This closed cross section C2 is of a roughly trapezoidal shape and extends in the vehicle longitudinal direction. An upper end portion of the pillar reinforcement 13 is joined to a left-end side wall portion of the roof rail reinforcement 23.

Figure 4:
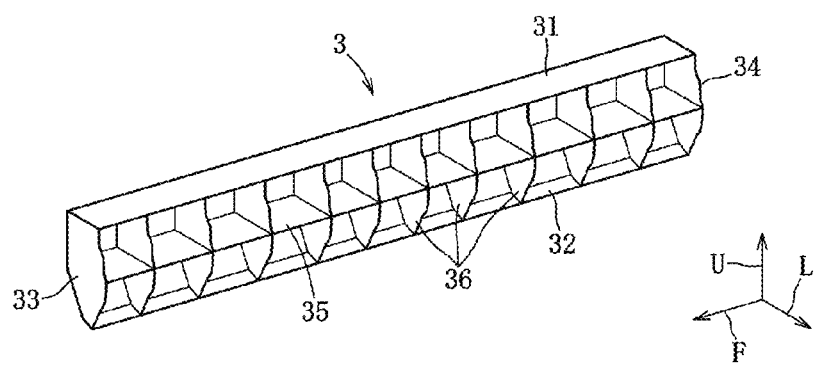
FIG. 4 is a perspective view of a reinforcing member, when viewed from the left.
Figure 5:
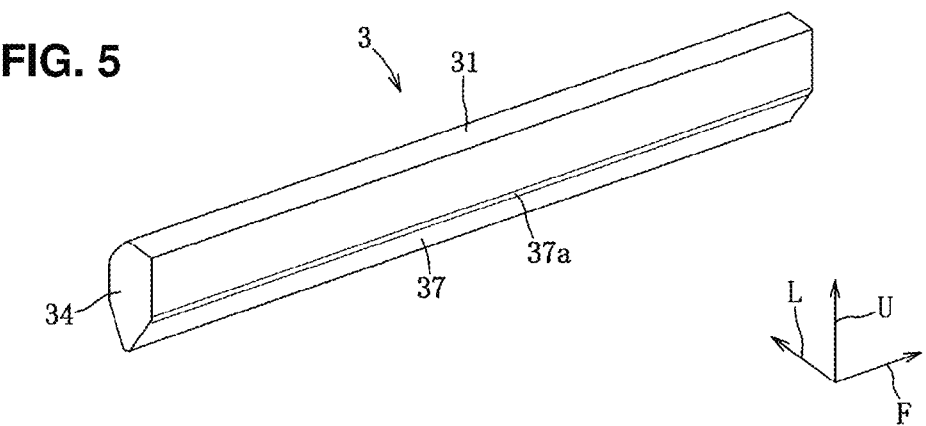
FIG. 5 is a perspective view of the reinforcing member, when viewed from the right.

Next, the reinforcing member 3 will be described. The reinforcing member 3 is fixed to a middle area, in the vehicle longitudinal direction, inside the closed cross section C2. As shown in FIGS. 3-5, the reinforcing member 3 comprises an upper wall portion 31, a lower wall portion 32, a front wall portion 33, a rear wall portion 34, a lateral wall portion 35 which extends roughly in parallel to the upper wall portion 31 at the middle portion, plural vertical wall portions 36 which partition a space formed between the front wall portion 33 and the rear wall portion 34 into plural sections, and a bottom wall portion 37 which connects to respective end portions of the wall portions 31-36. Thus, the reinforcing member 3 is formed in a honeycomb shape with a floor which opens leftward.

The upper wall portion 31 extends leftward roughly horizontally, a lateral width of which is set to be smaller than that of the lateral wall portion 35. The lower wall portion 32 is configured such that a right-side portion thereof goes upward gradually, and its lateral width is set to be smaller than that of the upper wall portion 31. The bottom wall portion 37 has a bending portion 37a configured to extend in the vehicle longitudinal direction at its middle portion which corresponds to the position of the above-described ridgeline R. This bottom wall portion 37 has a face contact with a left-side face of the roof rail inner 22 and is joined to this left-side face of the roof rail inner 22 by an anchor effect (an anchoring effect). The bottom wall portion 37 is joined to an upper-half portion of the roof rail inner 22 which is positioned above the ridgeline R and a lower-half portion of the roof rail inner 22 which is positioned below the ridgeline R, respectively. Respective left end portions of the wall portions 31-36 are spaced apart from the roof rail reinforcement 23, so that the reinforcing member 3 is provided to have a gap from the roof rail reinforcement 23.

Figure 6A:
FIGS. 6A, 6B and 6C are explanatory diagrams of manufacturing processes of the reinforcing member.
Figure 6B:
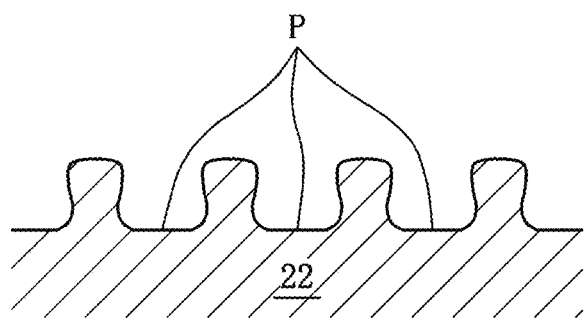
Figure 6C:
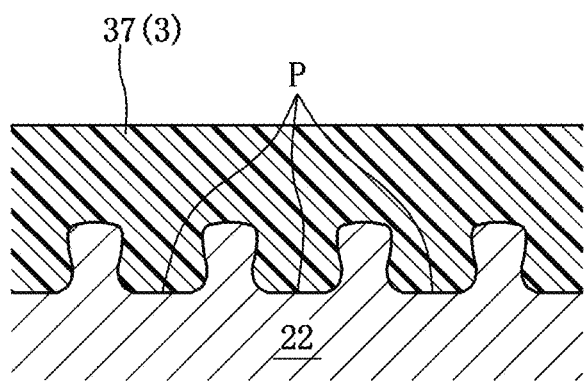

Manufacturing processes of the reinforcing member 3 will be described referring to FIGS. 6A, 6B and 6C. As shown in FIG. 6A, the roof rail inner 22, to which pressing process has been applied to form its contour, the ridgeline R and other portions, is set at a jig base so that its left-side face is positioned on its external-surface side, and a specified surface treatment (process), i.e., etching treatment (process), is applied to a joint area of the roof rail inner 22 where the bottom wall portion 37 is joined in a manufacturing step which is conducted later. As shown in FIG. 6B, some fine recess portions P are formed on the joint area of the roof rail inner 22.

The surface-treated roof rail inner 22 is assembled into an injection mold (not illustrated) to form the reinforcing member 3 so that the recess portions P can face an inside of cavity. Then, after mold clamping, injection molding is conducted by injecting a molten resin material. As shown in FIG. 6C, the molten resin material flows into the recess portions P and sets in an anchor shape, so that the reinforcing member 3 is integrally joined to the left-side face of the roof rail inner 22 by the anchor effect. After the reinforcing member 3 and the roof rail inner 22 are integrally joined to each other, the roof rail inner 22, the roof rail reinforcement 23, the roof rail outer 21 and others are assembled together. Herein, a material of the reinforcing member 3 is glass-reinforced plastics (GRP), such as glass fiber-compounded polyamide (nylon) resin.

Figure 7:
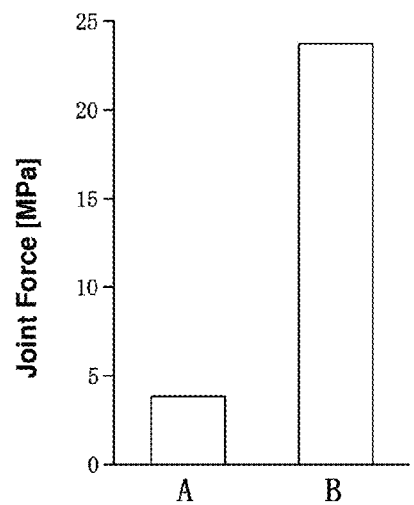
FIG. 7 is a comparative graph of a joint force in a case in which an adhesive agent is used and a joint force in a case in which an anchor effect is used.
Figure 8:
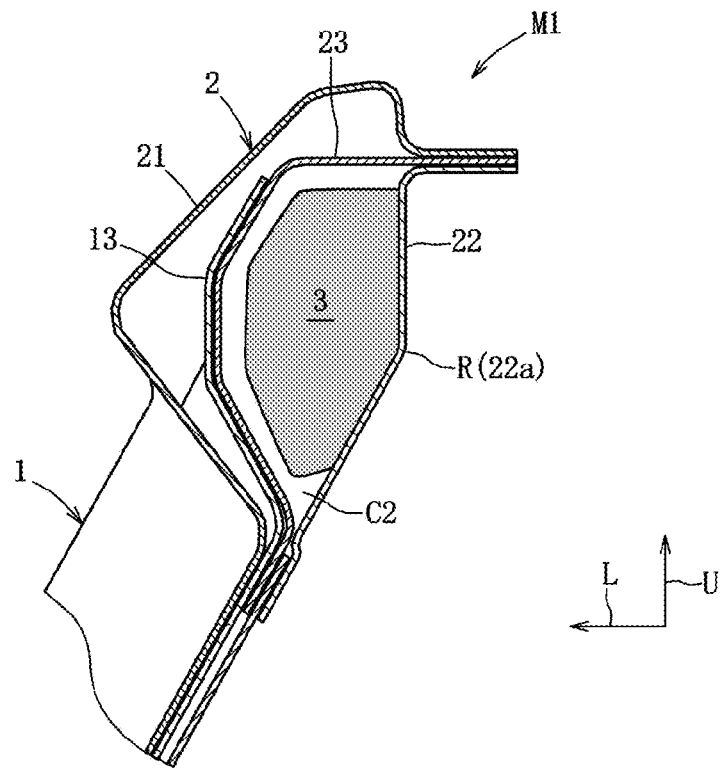
FIG. 8 is an explanatory diagram of a model M1 before deformation.
Figure 9:
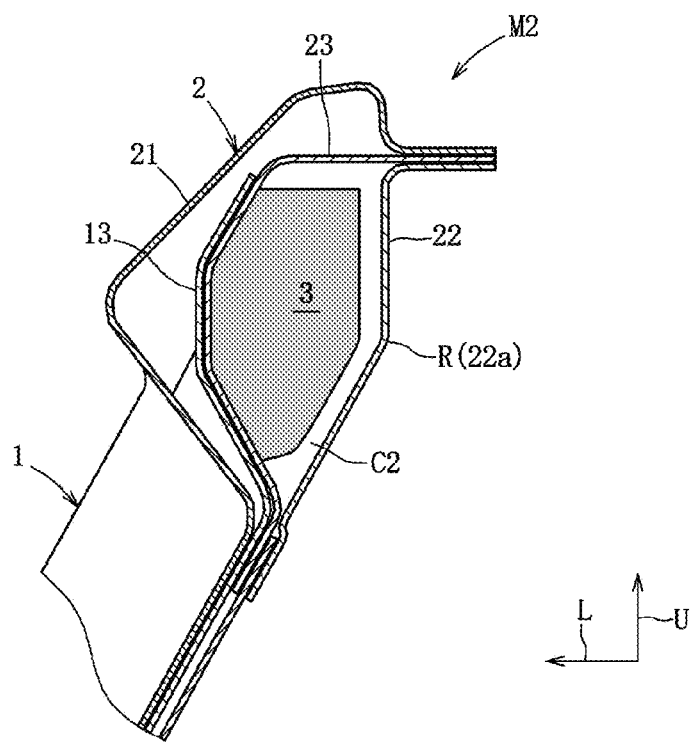
FIG. 9 is an explanatory diagram of a model M2 before deformation.

Next, the operations/effects of the upper vehicle-body structure of the vehicle V of the present embodiment will be described. First, after the reinforcing member 3 and the roof rail inner 22 were formed individually, a member A which was formed by joining the reinforcing member 3 and the roof rail inner 22 with a general adhesive agent and a member B which was formed by integrally joining the reinforcing member 3 and the roof rail inner 22 with the anchor effect were respectively prepared. Then, experiments for evaluating a joint force of the reinforcing member 3 and the roof rail inner 22 for these members A, B were conducted. The results of these evaluation experiments are shown in FIG. 7. The joint force of the member A was 4 MP and the joint force of the member B was 24 MP. Thus, it was found that the integrally joining with the anchor effect could ensure a joint area, avoiding stress concentration, and also could increase the joint force so greatly, compared with the joining by the adhesive agent.

Next, the evaluation experiments by simulation will be described referring to FIGS. 8-12. A model M1 (see FIG. 8) which was formed by integrally joining the reinforcing member 3 and the roof rail inner 22 and a model M2 (see FIG. 9) which was formed by integrally joining the reinforcing member 3 and the roof rail reinforcement 23 were respectively prepared. Then, respective deformation moves of these models M1, M2 were analyzed by CAE (Computer Aided Engineering). In this simulation of the deformation moves, the same load acting on the center pillar 1 of the models M1, M2 toward the cabin was applied and then respective bending moments (k Nm) acting on the roof side rail 2 of the models M1, M2 were compared with each other. Herein, in the models M1, M2, the same members as the embodiment are denoted by the same character references.

Figure 10:
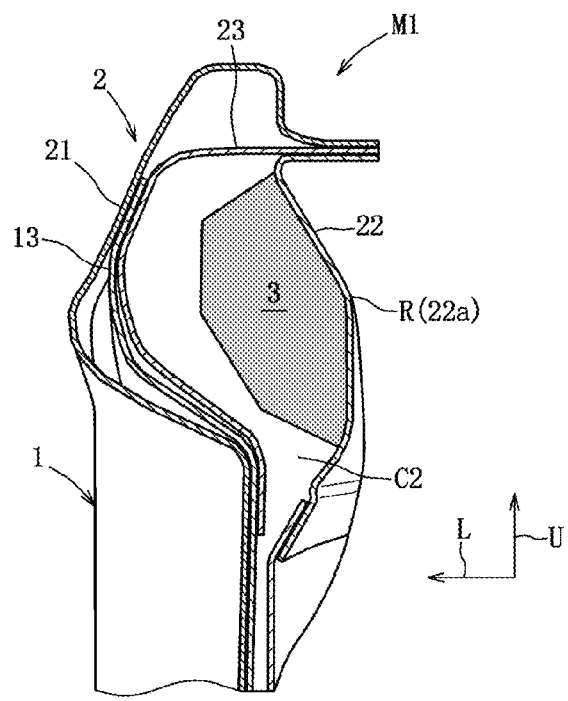
FIG. 10 is an explanatory diagram of the model M1 after the deformation.
Figure 11:
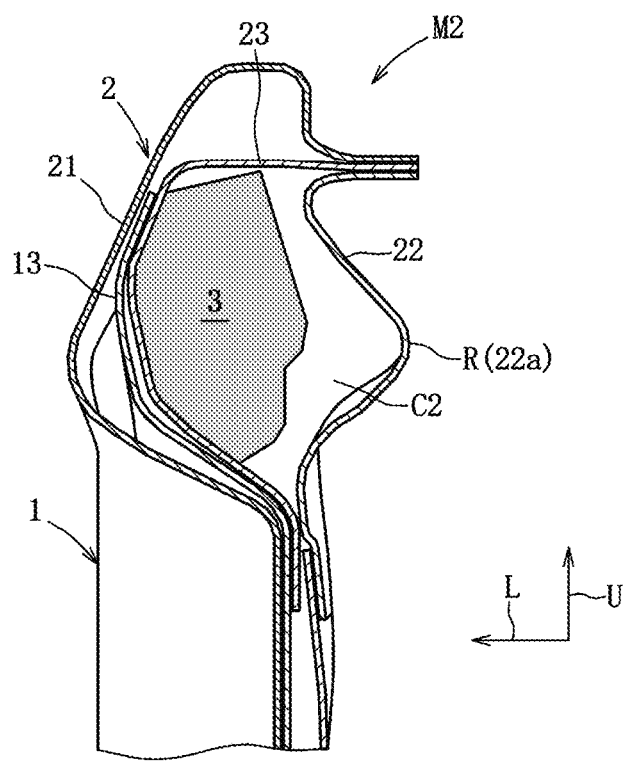
FIG. 11 is an explanatory diagram of the model M2 after the deformation.
Figure 12:
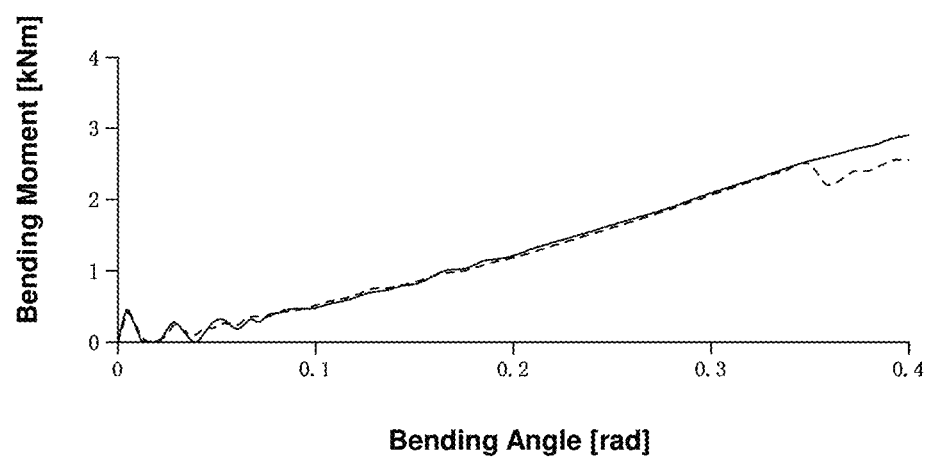
FIG. 12 is a graph showing changes of respective bending moments of the models M1 and M2.

The moves of the models M1, M2 when the specified load was applied are shown in FIGS. 10 and 11, and changes of the bending moments of the models M1, M2 are shown in FIG. 12. As shown in FIG. 10, the model M1 moved such that the center pillar 1 rotated counterclockwise around the roof side rail 2 without generating any buckling at the roof rail inner 22, and the distance between the reinforcing member 3 and the roof rail reinforcement 23 expanded according to this rotation. Further, little deformation occurred at the protrusion portion 22a including the ridgeline R, whereas large deformation occurred at the lower portion positioned below the protrusion portion 22a. As shown in FIG. 11, the model M2 moved such that the center pillar 1 rotated counterclockwise around the roof side rail 2, generating buckling at the roof rail inner 22, and the distance between the reinforcing member 3 and the roof rail inner 22 expanded according to this rotation. Further, little deformation occurred at the lower portion positioned below the protrusion portion 22a. As shown in FIG. 12, the bending moment (solid line) of the model M1 with no buckling increased proportionally to an increase of a bending angle, but the bending moment (broken line) of the model M2 with buckling showed an abrupt drop when the buckling occurred.

As described above, according to the model M1, the reinforcing member 3 did not receive any influence of the deformation of the roof rail reinforcement 23 caused by the deformation of the center pillar 1. Therefore, it can be assumed that the rigidity of the reinforcing member 3 was not deteriorated by the deformation of the roof rail reinforcement 23, but contributed to preventing buckling of the roof rail inner 22. Further, it can be considered that since no buckling occurred at the roof rail inner 22, the stress not concentrating on the protrusion portion 22*a* dispersed and concentrated on the lower portion positioned below the protrusion portion 22*a*. It can be assumed in the model M2 that since the reinforcing member 3 did not contribute to the prevention of buckling of the roof rail inner 22 with a bucking starting point at the protrusion portion 22*a* (ridgeline R), the stress concentrated on the protrusion portion 22*a*, so that the buckling occurred at the roof rail inner 22.

According to the present upper vehicle-body structure of the vehicle V, since there is provided the synthetic resin-made reinforcing member 3 provided inside the roof side rail 2 at the position near the upper end portion of the center pillar 1, improving the vehicle-body rigidity and making the vehicle lightweight can be compatibly achieved. Further, since the reinforcing member 3 is integrally joined to the outward face, in the vehicle width direction, of the roof rail inner 22 of the roof side rail 2 by the anchor effect, the reinforcing member 3 can be fixed mechanically and accurately inside the roof side rail 2, allowing manufacturing tolerance. Moreover, a relative slip of the roof rail inner 22 to the reinforcing member 3 is regulated, so that the buckling which occurs with the buckling starting point at the protrusion portion 22*a* can be suppressed.

The gap is formed between the reinforcing member 3 and the roof rail reinforcement 23. Thereby, since the collision energy acting on the roof rail reinforcement 23 in the vehicle side collision is not transmitted to the reinforcing member 3 directly, the rigidity of the reinforcing member 3 can be made to contribute to the buckling prevention of the roof rail inner 22 intensively.

Since the anchor effect is provided by roughening the surface of the outward face, in the vehicle width direction, of the roof rail inner 22, the anchor effect of the reinforcing member 2 and the roof rail inner 22 can be enhanced with a simple structure. Since the reinforcing member 3 is integrally formed by the injection molding incorporating the roof rail inner 22, the reinforcing member 3 and the roof rail inner 22 can be joined integrally with a simple structure.

Hereafter, modifications of the above-described embodiment will be described.

[1] While the above-described embodiment showed the example of the center pillar as the pillar member, a front pillar or a rear pillar is applicable as long as this is the one which connects to the roof side rail. Further, while the example of the steel plate-made pillar member was described, any metal material including the one used for a usual vehicle-body structure, such as aluminum-alloy material, is applicable as long as it can be integrally joined to synthetic resin by the anchor effect.

[2] While the above-described embodiment showed the example in which the bending-shaped protrusion portion equipped with the ridgeline is formed at the roof rail inner, the protrusion portion can include any processing portion which can become a bending starting point due to the stress concentration when the force acts on the pillar member toward the cabin. Specifically, a portion which is configured in the front view to protrude toward the cabin relative a line which connects an upper end portion of the roof rail inner and a lower end portion of the rood rail inner corresponds to the protrusion portion, and a shape of this protrusion portion can be a curve shape or a bending shape.

[3] While the above-described embodiment showed the example of the etching treatment (process) as the surface treatment (process), any other treatment, such as dip treatment (T treatment), razor processing, laser beam machining, shot peening, shpt blast, as long as fine unevenness can be formed at the surface of the joint area of the roof rail inner. Further, an electrical film with fine holes may be formed at the surface of the joint area of the roof rail inner.

[4] While the above-described embodiment showed the example in which the reinforcing member is made from thermoplastic polyamide resin, polyester resin, such as polycarbonate or PBT, can be applied. Further, thermoplastic resin, such as epoxy resin or unsaturated polyester resin, may be applied. While the above-described embodiment showed the example of the glass fiber-compounded synthetic resin, any of carbon fiber, aramid fiber, polyethylene fiber and the like is selectable voluntarily.

[5] The present invention should not be limited to the above-described embodiments, and any other modifications or improvements may be applied within the scope of a spirit of the present invention.

What is claimed is:

1. An upper vehicle-body structure of a vehicle, comprising:
   a pillar member extending in a vertical direction;
   a roof side rail connected to an upper end portion of the pillar member and having a closed cross section extending in a vehicle longitudinal direction; and
   a synthetic resin-made reinforcing member provided inside the roof side rail at a position near the upper end portion of the pillar member,
   wherein said roof side rail comprises a metal-made inner member which has a portion protruding toward a cabin and a metal-made outer member which forms said closed cross section together with the inner member,
   said reinforcing member provided inside the closed cross section formed by the inner member and the outer member is provided to have a gap from the outer member,
   said reinforcing member has a wall-face portion on an inner-member side thereof, and said wall-face portion of the reinforcing member is integrally joined to an outward face, in a vehicle width direction, of the inner member by an anchor effect.

2. The upper vehicle-body structure of the vehicle of claim 1, wherein said inner member of the roof side rail has said protrusion portion which protrudes toward the cabin relative a line which connects an upper end portion of the inner member and a lower end portion of the inner member.

3. The upper vehicle-body structure of the vehicle of claim 2, wherein said protrusion portion of the inner member of the roof side rail comprises a ridgeline portion which extends in the vehicle longitudinal direction at an apex thereof and a pair of flat-face portions positioned above and below the ridgeline portion.

4. The upper vehicle-body structure of the vehicle of claim 2, wherein said reinforcing member further comprises plural vertical ribs which extend in the vertical direction in an area which matches said protrusion portion of the inner member.

5. The upper vehicle-body structure of the vehicle of claim 3, wherein said reinforcing member further comprises plural vertical ribs which extend in the vertical direction in an area which matches said protrusion portion of the inner member.

6. The upper vehicle-body structure of the vehicle of claim 4, wherein said reinforcing member further comprises a lateral rib which extends in the vehicle longitudinal direction, crossing and connecting to said plural vertical ribs.

7. The upper vehicle-body structure of the vehicle of claim 5, wherein said reinforcing member further comprises a lateral rib which extends in the vehicle longitudinal direction, crossing and connecting to said plural vertical ribs.

8. The upper vehicle-body structure of the vehicle of claim 1, wherein a treatment of roughening said outward face, in the vehicle width direction, of the inner member of the roof side rail is applied, whereby said anchor effect is provided.

9. The upper vehicle-body structure of the vehicle of claim 1, wherein said reinforcing member is formed integrally by an injection molding in which said inner member of the roof side frame is incorporated.

* * * * *